United States Patent Office 2,974,111
Patented Mar. 7, 1961

2,974,111

ACTIVATED INORGANIC METAL OXIDES

William G. Nixon, Westchester, Ill., assignor, by mesne assignments, to Universal Oil Products Company, Des Plaines, Ill., a corporation of Delaware No Drawing. Filed Oct. 13, 1958, Ser. No. 766,675

8 Claims. (Cl. 252—466)

The present invention, in its broad scope, relates to the manufacture of refractory inorganic metal oxides, and particularly to the subsequent utilization thereof as carrier material for active metallic components in the manufacture of catalytic composites. More specifically, the present invention is directed toward an improvement in processes for manufacturing alumina, which improvement produces an activated alumina particularly adapted for utilization as a carrier material in the manufacture of catalytic composites, or as an absorbing or desorbing medium when employed as a desiccant or other suitable treating and purifying agent. When ultimately employed as the major component of a catalytic composite, the alumina, produced in accordance with the method of the present invention, is especially suited for use in processes for the reforming and isomerization of hydrocarbons; the alumina of the instant invention, when combined with other inorganic metal oxides (especially silica), is advantageously employed in processes for the catalytic cracking of hydrocarbons; in and of itself, the alumina affords benefits to processes requiring an absorbing agent, as in the physical separation of various organic compounds.

Refractory inorganic metal oxides are widely employed throughout many types of commercial industries; they are particularly utilized in the chemical and petroleum industries as a carrier material for catalytic composites, or, in a few isolated instances, as a catalyst in and of themselves. Inorganic metal oxides, including alumina, silica, magnesia, thoria, boria, titania, zirconia, etc., and mixtures thereof, are generally employed, without the addition thereto of catalytically active metallic components, as dehydrating, desorbing, treating, adsorbing, or purifying agents. The inherently high degree of porosity, possessed by refractory inorganic metal oxides, is one of the more prominent factors affecting their extensive use in removing solid contaminants from liquid and gaseous streams, liquid contaminants from gaseous streams, etc. The refractory metal oxides most frequently employed, in view of their high adsorptive capacity, are alumina and silica, and mixtures thereof. The addition of other refractory inorganic oxides, as hereinabove set forth, is generally effected during processes for manufacturing catalytic composites for the primary purpose of imparting thereto certain desired physical characteristics. These physical characteristics, in turn, are designed to induce particular effects upon the reactions which are required to be promoted.

The object of the present invention is to produce a refractory inorganic metal oxide, and particularly alumina, which possesses an exceptionally high degree of adsorptive capacity when serving the function of either a carrier material for catalytically active metallic components, or a treating or purifying agent, or desiccant.

In one embodiment, the present invention provides an improvement in the process of manufacturing a refractory inorganic metal oxide, which improvement comprises contacting the inorganic metal oxide, at a temperature in excess of 25° C., with sulfur dioxide.

In another embodiment, the present invention relates to an improvement in those processes for manufacturing a refractory inorganic metal oxide wherein the refractory inorganic metal oxide is subjected to a high-temperature calcination treatment, in the presence of a free oxygen-containing gaseous material, which improvement comprises causing the metal oxide to contact, at a temperature in excess of 25° C., with sulfur dioxide in the absence of said free oxygen-containing gaseous material.

In still another embodiment, the present invention provides a method for manufacturing alumina which comprises preparing the alumina, contacting said alumina, at a temperature within the range of from about 100° C. to about 700° C., with sulfur dioxide, and thereafter subjecting the sulfur dioxide-treated alumina to high-temperature calcination.

When utilized as a carrier material for catalysts containing one or more catalytically active metallic components, the refractory inorganic oxide, and particularly alumina, prepared in accordance with the present invention, results in a more active catalyst than has heretofore been obtained. In addition, the catalyst indicates a high degree of stability—the capability of performing its intended function over an extended period of time without the necessity of unduly frequent regenerations thereof. This increased activity and stability appears to be due, at least in part, to the resulting increased surface area, and decreased pore diameter, of the inorganic oxide which is employed as the carrier material. As hereinafter set forth, the treatment with sulfur dioxide also causes a change in the physical state of the active metallic component. Whatever catalytically active metal components are combined therewith, the result is a more homogeneous catalyst, and one in which the active metallic components are more thoroughly integrated throughout the inorganic oxide particles. Other beneficial aspects derived through the use of sulfur dioxide are hereinafter described.

Industries such as the pharmaceutical, detergent, heavy chemical, petroleum, insecticidal, etc. utilize active metal-containing catalysts for the purpose of promoting a multitude of reactions, among which are hydrogenation, cyclization, cracking, polymerization, dehydrogenation, sulfonation, alkylation, hydrocracking, oxidation and, under particular conditions of operation and catalyst, isomerization. Whatever the specific industry, and the particular reaction desired to be affected therein, it is extremely essential, for commercial acceptance, that the catalyst employed exhibit a high degree of activity, and the prolonged capability to perform its intended function. Of necessity, therefore, the catalyst must be homogeneous as to composition, and particularly uniform, particle to particle, with respect to the concentrations of the various catalytic components.

Another object of the present invention is to provide an active metal-containing catalytic composite which, due to the high degree of homogeneity in regard to its composition, is possessed of the necessary activity, required to result in high yields of the desired end product, and the requisite stability which enables the catalyst to perform its intended function for extensive periods of time without the necessity of involved, tedious regeneration.

Therefore, in another embodiment, the present invention relates to a method for manufacturing an inorganic metal oxide-active metal component catalyst which comprises preparing the inorganic metal oxide, causing said inorganic oxide to contact, at a temperature of from about 100° C. to about 700° C., with sulfur dioxide and thereafter impregnating the sulfur dioxide-treated metal oxide with said active metal component.

In its most specific embodiment, the present invention provides a method for manufacturing an alumina-platinum catalytic composite which comprises preparing the alumina, causing the same to contact with sulfur dioxide at a temperature within the range of about 100° to about 700° C., calcining the sulfur dioxide-treated alumina at elevated temperatures, impregnating the calcined alumina with said platinum and thereafter drying and calcining the resulting alumina-platinum composite.

Although the method of the present invention is applicable to the manufacture of a variety of refractory inorganic oxides, which have hereinbefore been set forth, in the interest of simplicity and brevity, the following is limited to the manufacture of alumina, alumina when utilized with other of the refractory inorganic metal oxides, or alumina when employed as a carrier material in manufacturing catalytically active composites. It is understood, however, that it is not intended to limit unduly the present invention beyond the scope and spirit of the appended claims. It is further understood that the method of the present invention may be utilized to advantage in the preparation of refractory inorganic metal oxides possessing high adsorptive capacity, whether alumina, alumina-silica, silica, and other refractory inorganic oxides either alone or in combination with the alumina and/or silica.

In the present specification, as well as the appended claims, the term "alumina" is employed to mean aluminum oxide in all states of oxidation and in all states of hydration, as well as aluminum hydroxide. The alumina to be treated in accordance with the present invention may either be synthetically prepared, or naturally occurring, or of the crystalline or gel type. Alumina exists in a variety of physical modifications, which are known as alpha-alumina, gamma-alumina, and epsilon-alumina, and which are of the mono- or tri-hydrate form. The various forms of alumina are recognized by many trivial and trade names such as Gibbsite, Boehmite, Bayerite, and Diaspore, and it is intended to include all such forms.

The alumina, to be improved through the utilization of the method of the present invention, may be manufactured through the utilization of any of the well-known, suitable methods of manufacture. Alumina may be prepared, for example, by adding a suitable alkaline reagent such as ammonium hydroxide to a salt of aluminum metal, such as the chloride, the sulfate, the carbonate, etc., in an amount to form aluminum hydroxide which, upon drying and calcining in a free oxygen-containing atmosphere, is converted to alumina. Other refractory inorganic oxides, particularly silica, may be added to the alumina through any suitable manner including separate, successive or co-precipitation means. A preferred form of alumina is the sphere, although alumina takes on a variety of shapes such as pills, granules, cakes, extrudates, etc. When in the form of spheres, they may be continuously manufactured by passing droplets of an aluminum chloride hydrosol into an oil bath maintained at an elevated temperature, retaining the droplets within said oil bath until they set to firm hydrogel spheroids. The spheres are continuously withdrawn from the oil bath, and immediately thereafter subjected to specific aging treatments for the purpose of imparting thereto certain desired physical characteristics. It is neither essential to the method of the present invention that the alumina be prepared in any particular manner, nor that the alumina exist in any special physical shape; the methods and various forms of alumina hereinabove set forth are intended to be illustrative rather than restrictive upon the present invention.

The method of the present invention is specifically directed to applications in the manufacture of catalytic composites containing platinum; however, other noble metals, such as iridium, palladium, rhodium, and ruthenium, and catalytic composite containing other metals can be manufactured advantageously through its use. Other metals can be composited with the refractory inorganic oxide and subsequently employed therewith as catalytically active components of the catalysts, and these catalysts are improved in activity and stability through the use of the method of the present invention. Catalytic composites which can be manufactured to a high degree of activity and stability through the incorporation of the method of the present invention comprise metallic components such as, but not limited to, vanadium, chromium, tungsten, cobalt, copper, sodium and other alkali metals, silver, rhenium, molybdenum, nickel, cesium, other metals of groups VI and VIII of the periodic table, mixtures of two or more, etc. The metal component may exist either in the elemental state or in combination as the halide, oxide, nitrate, sulfate, etc. It is understood that the benefits afforded catalysts containing different metal components are not equivalent, and that the effects of employing the method of the present invention with a particular metal component, or components, are not necessarily the same effects observed with regard to some other metal component, or mixture of metal components.

Generally, the amount of the metal component composited with the catalyst is comparatively insignificant with respect to the quantities of the other components combined therewith. For example, platinum and/or palladium and other noble metals will generally comprise from about 0.01% to about 5% by weight of the total catalyst, and usually from about 0.1% to about 1% by weight. The use of other metal components is generally dependent upon the specific use for which the particular catalyst is intended. In any case, however, the concentrations of the metal components will be small, and will generally be within the range of from about 0.01% to about 10% by weight of the total catalyst.

Halogen is generally composited with the catalyst in concentrations of from about 0.01% to about 8% by weight of the total catalyst (computed on a dry basis, and as the elemental halogen), and may be either fluorine, chlorine, or mixtures of the same. Fluorine appears to be possessed with a high degree of tenaciousness, and is less easily removed from the catalyst during the process in which the same is employed; it is, therefore, preferred in many instances. The halogen is combined with one or more of the other components of the catalyst, and is, therefore, generally referred to as combined halogen. The combined halogen imparts a desired degree of acidity to the final catalytic composite, and in this respect, fluorine and chlorine are considered equivalent, although, as hereinabove stated, fluorine is preferred due to its ability to remain composited with the other catalytically active components during the operation of the process in which it is employed.

The halogen may be added to the alumina in any suitable manner, and either before or after the addition thereto of the other catalytic components. While halogen is added as gaseous chlorine or fluorine, in some instances it is often added as an aqueous solution of a hydrogen halide. The halogen is often added to the refractory oxide before the other components are composited therewith, and this is accomplished through the use of an acid such as hydrogen fluoride and/or hydrogen chloride. In some cases, volatile salts such as ammonium fluoride, ammonium chloride, etc. are employed. In other instances, the alumina is prepared from an aqueous solution of the aluminum halide, which method affords a convenient manner of compositing the halogen while at the same time, manufacturing the alumina. Halogen may also be composited with the alumina during the impregination of the latter with the active metallic component.

It is understood that the benefits afforded catalytic composites containing different active metal components, and/or other non-metallic components, through the utilization of the present invention, are not equivalent, and that the effects of employing sulfur dioxide in conjunction with the manufacture of a particular catalytic composite are not necessarily the same effects observed with other catalytic composites. It is further understood that the method of the present invention is not unduly restricted to the manufacture of refractory inorganic metal oxides for use as the carrier material in the subsequent manufacture of catalytic composites. The essential feature of the present invention is the utilization of sulfur dioxide in the process of manufacturing refractory inorganic metal oxides, and particularly alumina; the ultimate use, for which the metal oxide is intended, is not considered to be a limitation upon the broad scope of the present invention. The method of the present invention insures completely uniform distribution of the catalytic components within and throughout the carrier material by providing a refractory inorganic metal oxide of increased surface area and decreased pore diameter. Other advantages, afforded through the use of sulfur dioxide, are hereinafter set forth in greater detail.

The exact nature of the phenomenon, effected through the action of sulfur dioxide, which phenomenon results in the beneficial change in the surface-area characteristics of the inorganic oxide is not known precisely. It has been shown, as will hereinafter be set forth, that the treatment with sulfur dioxide yields a refractory inorganic oxide with improved surface-area characteristics, whether the inorganic oxide is first prepared by a suitable, well-known method and subsequently treated with sulfur dioxide, or the sulfur dioxide treatment is made an integral step within such method. Preferably, the inorganic metal oxide is contacted, in accordance with the method of the present invention, with the sulfur dioxide, prior to subjecting said inorganic oxide to a high-temperature calcination treatment. In general, most of the methods of manufacture presently employed, yield a refractory inorganic metal oxide which is substantially saturated with water, both free and combined. The oxide is necessarily dried, usually at temperatures within the range of about 25° C. to about 100° C. and calcined, in the presence of air, at substantially elevated temperatures of about 100° C. to about 700° C. and higher. The preferred method of the present invention is to cause the wet refractory material to contact with the sulfur dioxide, and, following a brief purge with nitrogen, or other gaseous substance not reactive with either sulfur dioxide or the inorganic oxide, or both, to remove traces thereof, to subject the oxide to the high-temperature calcination treatment. The length of the sulfur dioxide treatment, as well as the concentration, or total amount, of sulfur dioxide passing through the refractory material, is dependent upon the quantity of material to be so treated, the amount of water, both free and combined, contained within the refractory material, the means employed to disperse the sulfur dioxide throughout the refractory material, and, as hereinafter described, the quantity of sulfur dioxide (calculated as the percentage of elemental sulfur) desired to be ultimately combined with the final inorganic oxide, or with the catalytic composite subsequently prepared therefrom. The determination of the quantity of sulfur dioxide, which is to be employed, can readily be made by one skilled in the art, when such factors are intelligently considered. It appears that there exists a finite stage, during the treatment with sulfur dioxide, at which stage the maximum change in surface-area characteristics has taken place. Any further treatment with sulfur dioxide would be uneconomical, and no advantage in utilizing an excess thereof is readily foreseeable. It appears that the sulfur dioxide treatment has attained its maximum effectiveness when the refractory material through which it is being dispersed has visually become substantially free from water.

The following examples are given for the purpose of illustrating the method of the present invention, and to indicate more fully the benefits to be derived through the utilization thereof. It is not intended to limit unduly the scope of the present invention to the particular reagents, processing conditions and/or concentrations employed within the examples. Insignificant modifications, within the scope and spirit of the appended claims, will become readily apparent to those skilled in the art of manufacturing refractory inorganic oxide material, and particularly in the art of manufacturing alumina and employing the same as the carrier material in the subsequent manufacture of catalytic composites.

EXAMPLE I

An aluminum chloride hydrosol, having an aluminum to chloride weight ratio of 1.2:1, was utilized, in accordance with the oil-drop method hereinbefore described, to prepare the firm alumina hydrogel spheroids. A first portion of the alumina spheroids was dried to a temperature of 250° F., thereafter being placed in a glass furnace tube and subjected to a calcination treatment, in the presence of air, to a temperature of 500° C. The furnace tube was maintained at this temperature for a period of two hours, after which time the tube was allowed to cool to room temperature, the calcined alumina spheres being removed and subsequently analyzed for the surface-area characteristics. The pore diameter was found to be 133° (Angstrom units), and the surface area, 201 square meters per gram; the analyses were made in accordance with the standard Brunaur-Emmett-Teller nitrogen adsorption procedure.

EXAMPLE II

A 50 cubic centimeter portion of the alumina spheres, formed and aged by the oil-drop method, which spheres had not previously been subjected either to drying or to a high-temperature calcination treatment, were rinsed with an aqueous solution of methyl alcohol to remove organic contaminants. The washed spheres, while still in a wet state, were placed in a glass furnace tube at room temperature (about 80° F.), and therein subjected to a stream of gaseous sulfur dioxide for a period of one hour while the temperature was being increased to a level of 300° C. The treated spheres were then purged with a stream of nitrogen for a period of about 5 minutes, and thereafter subjected to high-temperature calcination, in an atmosphere of air, at a temperature of 500° C. for a period of two hours. The furnace tube was permitted to cool to room temperature and the spheres therein removed and analyzed by the Brunaur-Emmett-Teller nitrogen-adsorption method to determine the surface-area characteristics thereof. These were as follows: A surface area of 280 square meters per gram, a pore volume of 0.378 cubic centimeter per gram and a pore diameter of 54 A.

An 80 cubic centimeter portion of wet, uncalcined alumina spheres was washed with an aqueous solution of methyl alcohol, and placed in a glass furnace tube; the spheres were subjected therein to air oxidation, at a temperature of 150° C., for a period of two hours.

Following a brief purge with nitrogen, the air oxidized spheres were treated with gaeous sulfur dioxide (at a rate of 50 cc. per minute) diluted with nitrogen (at a rate of 300 cc. per minute) to a temperature of 300° C. At this temperature, the supply of sulfur dioxide was shut off, and the nitrogen stream utilized as a purge for a period of about 5 minutes. Thereafter the treated spheres were subjected to a high-temperature calcination, in the presence of air, at a temperature of 500° C. for a period of three hours.

These spheres, subjected to the treatment with sulfur dioxide from a temperature of 150° C. to a temperature of 300° C., exhibited a somewhat greater degree of hardness than those spheres which had been treated from room temperature to 300° C. In addition, the surface area characteristics were determined as a pore diameter of 58 A., a pore volume of 0.391 cubic centimeter per gram and an area of 271 square meters per grame.

The foregoing examples are presented to illustrate the method of employing the present invention in the manufacture of refractory inorganic metal oxides, and indicate the benefits afforded through the utilization thereof. The examples indicate the advantages of treating the alumina, while in a wet state, at temperatures in excess of 25° C., and illusrate additional benefits of somewhat higher temperatures—from about 100° C. to about 400° C. The use of gaseous uslfur dioxide has resulted in an increase of 37.3% in surface area and a decrease in pore diameter of 57.9%, and, at the increased temperature, a sphere possessing a greater degree of crushing strength. As hereinbefore stated, inorganic metal oxides possessing high surface area, in addition to a smaller pore diameter, are especially well adapted for utilization as the carrier material for catalytically active metallic components in the manufacture of catalysts.

Alumina, when impregnated with a noble metal component, particularly platinum, and various non-metallic components such as chlorine and/or fluorine, yields a catalytic composite particularly well suited for the reforming of hydrocarbons, and, upon application of particular processing conditions, the isomerization of relatively pure hydrocarbons of the class of lower molecular weight paraffins such as butanes, pentanes and hexanes. The platinum-alumina-combined halogen catalyst promotes a variety of desirable reactions, during the reforming of hydrocarbons, including (as a principal reaction) the dehydrogenation of naphthenes to aromatics, as well as hydrocracking, isomerization of straight-chain paraffins, and to a somewhat lesser extent, the dehydrocyclization of various paraffins directly to aromatics. These reactions combine, in the presence of noble metals, and particularly platinum, to effect a substantial increase in the octane rating of the particular gasoline and/or naphtha fractions processed, and provide for increased volumetric yields of the higher-octane product. Through the appropriate selection of operating conditions, which are, to a great extent, dependent upon the physical and chemical characteristics of the material to be processed, this particular type of catalyst may be employed for an extended period of time without the necessity for frequent regeneration to restore catalyst activity, the latter having declined as a result of the deactivation of the catalyst.

Catalyst deactivation may result from any one, or a combination of adverse effects; it may result from substances which are peculiar to a particular catalyst, and which either effect a change in the physical or chemical state of the various individual components of the catalyst, or which results in the removal of said components. Catalyst deactivation may also be effected through the deposition of impurities which usually take the form of finely divided solids which cover the catalytically active surfaces and centers, thereby shielding them from the materials being processed. Although the deposition of coke and other heavy carbonaceous material is a direct, and frequent, cause of catalyst deactivation, such deposits are usually accompanied by one or more of the other causes of catalyst deactivation hereinabove set forth. The coke and carbonaceous material is deposited to a great degree during the initial, early stages of the reforming operation while the catalyst employed therein exists in its most highly active state with regard to the entire period of operation. This high degree of coke deposition during the initial stages of operation, is believed to be due to the inherent ability of fresh, highly active catalyst to promote preferentially certain reactions which are detrimental to catalyst activity and stability. As the period of time during which the catalyst is employed is extended, the preference to promote detrimental reactions diminishes until such time as it no longer exists effectively. However, at this particular stage of the process, the catalyst has become deactivated to the extent that it is no longer capable of performing he intended function to the necessary and desired degree. One particular reaction which is especially deleterious to the activity of catalysts employed in processes for the reforming of hydrocarbons, particularly platinum-containing catalysts, and which reaction is extensively promoted by fresh, highly active catalyst, is the demethylation reaction. At the operating conditions generally employed during the reforming process, the demethylation reaction effects excessive coke deposition and results thereby in extremely rapid catalyst deactivation.

That the demethylation reaction, as well as other coke-forming reactions, is promoted to a greater extent by new, highly active noble metal-containing catalysts, than by the same catalyst after a comparatively short period of use, is believed to be due to the presence, within the composite, of a necessary excess of catalyst activity. In order to achieve an extended, successful catalyst life, the composite, when initially employed, contains a sufficient reserve of catalytically active components. This reserve provides the insurance for the depletion, by normal deterioration, of the catalytic components over extended periods of time. The presence of this necessary excess of catalyst activity has the tendency to induce the undesirable side reactions, especially the demethylation reaction, and consequently causes excessive, early deposition of coke and carbonaceous material. The method of the present invention results in a platinum-containing catalyst which successfully inhibits these reactions until such time as they are no longer consequential, not being promoted preferentially, and therefore do not tend to induce adverse effects upon the catalyst. It is recognized that the prior are is replete with instances of the employment of sulfur, and compounds thereof, for the purpose of inhibiting undesirable reactions, and, to a certain extent, in order to control the promotion of these reactions during he period of processing in which here is induced the greatest detrimental effects. Also, sulfur has been extensively employed for the prime purpose of controlling the degree to which hydrocracking is effected during the entire period of operation.

In order to obtain the beneficial effects afforded through the presence of sulfur within the reaction zone, it has been considered necessary that a suitable sulfur-containing compound be continuously added to the liquid charge to the reforming zone, or, added as hydrogen sulfide directly to the hydrogen-rich gas stream commonly being continuously recycled as an integral portion of the reforming or isomerization process. There are incurred, however, unnecessary difficulties in metering, handling and controlling the gaseous and/or liquid substances when these are employed as the means of maintaining a particular concentration of sulfur, or hydrogen sulfide, within the reaction zone. On the other hand, many processes utilize a catalytic composite of which sulfur has been designedly made a specific component. Stringent exercise over the control of the concentration of the sulfur present in the reaction zone is of major import in view of the fact that sulfur is well known to be an effective deactivator of noble metal catalysts, and, for this reason, cannot generally be employed to take advantage of its beneficial characteristics. Through the method of the present invention, a minor quantity (with respect to the total of the overall composite) of sulfur, which quantity will suffice to suppress the detrimental reactions prevalent at the outset of the operation of the process, as well as suppress excessive hydrocracking during the remaining portion of the process, is utilized as a component of the catalytic composite employed within the reaction zone.

The utilization of sulfur dioxide, in treating the refractory inorganic metal oxide, either before or after the active metallic components have been composited therewith, results in a quantity of sulfur, as a component of the catalyst, which is sufficiently great to successfully inhibit the detrimental reactions at the outset of the operation, and, as will hereinafter be indicated, is not susceptible to virtually complete leaching therefrom. The fact that a sufficient quantity of sulfur possesses the tenacity to remain as a component of the catalyst, eliminates the requirement for extensive, continuous and/or intermittent sulfur addition in order to replenish that sulfur which is removed from the catalyst. There is insured, thereby, a constant level of catalyst activity and control with respect to the combination of the desired reactions. The catalyst within the reforming zone will be caused to successfully inhibit these reactions during that period of operation in which the detrimental reactions are no longer of consequence with respect to those reactions which are desired to be promoted.

EXAMPLE III

The refractory inorganic metal oxide carrier material employed in this example comprised alumina containing combined fluoride. This inorganic oxide composite was prepared from a mixture of equal volumes of a 28% by weight solution of hexamethylene tetramine in water, and an aluminum chloride sol containing 12% by weight aluminum and 10.8% by weight combined chloride. The chloride content of the alumina had been reduced, through the use of steam, to approximately 0.05% by weight on a dry basis. The fluoride was added by way of an aqueous solution of hydrogen fluoride, and the mixture was formed into hydrogel spheroids by the oil-drop method; the spheres were washed, dried to a temperature of 650° C., and subsequently calcined at that temperature, in the presence of air.

A portion of the calcined alumina spheres were commingled with 99 milliliters of an aqueous solution of chloroplatinic acid containing 10 milligrams of platinum per milliliter, plus 60 milliliters of water. The mixture was evaporated to dryness over a water bath at a temperature of 99° C., and further dried in a rotary drier to a temperature of 200° C. for a period of three hours. The chloride concentration was reduced to a level of 0.35% by weight via treatment with steam to remove chloride in excess of that amount. The composite was thereafter subjected to a high-temperature calcination treatment in the presence of air, at a temperature of 500° C., for a period of one hour. The impregnated catalyst was contacted with gaseous hydrogen sulfide for the purpose of composing sulfur therewith in the amount of about 0.20% by weight, calculated as elemental sulfur. This catalytic composite was designated as catalyst A.

361 grams of the calcined alumina spheres containing 0.35% by weight of combined fluoride (calculated as the element), were impregnated with an aqueous mixture of 135 milliliters of bromoplatinic acid containing 10 milligrams of platinum per ml. and 108 milliliters of chloroplatinic acid containing 12.44 milligrams of platinum per ml., the resulting solution being diluted with water to yield a total volume of 580 milliliters. Following the impregnation, the alumina spheres were dried on a steam bath, and further dried in a rotary drier for two hours at a temperature of about 200° F.

The impregnated platinum-containing spheres were placed in a glass furnace tube and purged briefly with nitrogen to a temperature of 200° C. The spheres were then contacted to a temperature of 500° C. with a gaseous mixture comprising 50 cubic centimeters of sulfur dioxide per minute and 600 cc. of nitrogen per minute. At the level of 500° C., the sulfur dioxide supply was shut off, and the nitrogen employed as a purge for a period of one hour. The sulfur dioxide-treated, impregnated spheres were then subjected to high-temperature calcination at a temperature of 500° C. for a period of two hours. The final catalytic composite was designated as catalyst B.

The two catalyst portions were subjected individually to a particular activity-stability test which consisted of passing a standard hydrocarbon charge stock, having a boiling range of about 200° F. to about 400° F., and an API gravity of 62.1°, at a liquid hourly space velocity (volumes of hydrocarbon charged per volume of catalyst within the reaction zone) of 2.0, in an atmosphere of hydrogen present in a mol ratio of hydrogen to hydrocarbon of 10:1 for a period of more than 20 hours. The reaction zones were maintained at a temperature of 515° C., and were under an imposed pressure of 300 p.s.i.g.

The liquid product from each of the activity-stability tests, collected from the individual reaction zones over the entire period of the tests, was subjected to various analyses to determine the physical characteristics thereof. In addition, the liquid product was separated into its component parts by precise distillation in a 30-plate glass fractionation column. Through the utilization of a material balance, the volumetric yields of these component parts, based upon the total liquid charge to the reaction zone, was computed. The measurement of the gaseous material, vented during the tests, and an analysis (by mass spectrometer) thereof, determined the yield of the light paraffin gases. Following the activity-stability tests, the reaction zones were permitted to cool to room temperature, the catalyst portions therein being removed and analyzed for the quantity of carbon deposition, an indication of the relative stability of the catalyst, and for the sulfur retention, also an indication of catalyst stability.

The various analyses performed on the gaseous and liquid products, and upon the catalyst portions, before and after being subjected to the test, are given in the following table, along with the calculated values of the various component yields.

As indicated in the table, the liquid products from the activity-stability tests were of the same quality, with regard to octane rating, and possessed virtually identical degrees of volatility, as indicated by the similarity of the individual gravities, ° API. The most significant aspect, in view of the similarity of the two products, lies in the fact that the catalyst prepared in accordance with the method of the present invention, resulted in an increase in the quantity of pentanes and heavier hydrocarbons of 1.0 volumetric percent. This increase is a direct result of the greater quantity of total pentanes produced by the catalyst of the present invention—7.7 volume percent as compared to the 6.8 volume percent which was produced by the catalyst not prepared through the method of the present invention. It is self-evident, upon comparing

*Table: Catalyst analyses and product yields and analyses*

| Catalyst Designation | A | B |
|---|---|---|
| Sulfur-Addition Treatment | $H_2S$ | $SO_2$ |
| Catalyst Composition, Wt. Percent: | | |
| Platinum | 0.75 | 0.75 |
| Chlorine | 0.34 | 0.32 |
| Fluorine | 0.35 | 0.33 |
| Total Halogen | 0.69 | 0.65 |
| Catalyst Analysis, Platinum Size, A | 30–40 | 100–110 |
| Catalyst Analyses After Test, Wt. Percent: | | |
| Carbon Deposition | 2.9 | 1.3 |
| Sulfur Retention | 0.01 | 0.08 |
| Liquid Product, Pentanes and Heavier: | | |
| Gravity, ° API | 47.4 | 48.1 |
| Octane Rating, F-1 Clear | 92.1 | 92.1 |
| Liquid Yields, Vol. Percent of Charge: | | |
| iso-Butane | 2.3 | 2.5 |
| n-Butane | 4.7 | 4.5 |
| iso-Pentane | 4.1 | 4.8 |
| n-Pentane | 2.7 | 2.9 |
| Hexanes and Heavier | 70.0 | 70.1 |
| Pentanes and Heavier | 76.8 | 77.8 |
| Gaseous Yields, s.c.f./bbl. of Charge: | | |
| Methane | 146.9 | 124.0 |
| Ethane | 98.1 | 99.6 |
| Propane | 90.1 | 89.3 |
| Total $C_1$–$C_3$ | 335.2 | 312.8 | the relative quantities of the hexanes and heavier hydrocarbons, the total butanes, and the amounts of the light paraffin gases, that the increase in pentane production has resulted from the inhibition of the demethylation reaction. As a result of the utilization of the catalyst treated with sulfur dioxide, there was effected a decrease of 22.9 s.c.f./bbl. of methane, or 15.6%. By comparing the individual yields of all the fractions, other than methane and total pentanes, the decrease in the former, coupled with the increase in the latter, becomes of greater significance.

Additional benefits afforded noble metal-containing catalysts, through the utilization of sulfur dioxide, are indicated by the individual quantities of carbon deposited upon the catalyst portions as a result of the activity-stability test. The catalyst prepared by the method which incorporated the treatment with sulfur dioxide, had deposited thereupon less than about 60% by weight of the amount of carbon which was deposited on the catalyst prepared in accordance with a method commonly practiced. Further, the sulfur-retention propensities of the catalyst of the present invention are shown to be greater than those of the catalyst prepared without the treatment of sulfur dioxide. A sufficient quantity of sulfur remains composited with the catalyst to enable the successful suppression, and control, of excessive hydrocracking throughout the remainder of the process.

The foregoing examples indicate clearly the method of the present invention, and the various benefits afforded through the utilization thereof. The use of sulfur dioxide has been shown to result in a refractory inorganic metal oxide of enhanced surface-area characteristics, in regard to its function in serving as an adsorbing medium, and the treatment with sulfur dioxide, when made an integral part of the process of catalyst manufacturing, is indicated as resulting in a catalyst possessing a high degree of activity, as well as the stability required for acceptable performance over extended periods of time. In those instances wherin the organic oxide material is impregnated with the active metallic components, prior to the treatment with sulfur dioxide, the latter has been shown, via the change in the platinum crystal size, to have advantageously effected the physical state of the active metallic component composited with the inorganic oxide. It is considered, therefore, to be within the scope of the present invention, to employ the treatment with sulfur dioxide, both before and after the inorganic metal oxide has been intimately combined with the active metallic components.

Briefly, a specific embodiment of the method of the present invention, for the manufacture of a catalytic composite, such as a platinum-alumina-chloride-fluoride catalyst, comprises drying alumina, which has been prepared in any suitable manner, and which may have been particularly subjected to specific aging treatments for the purpose of imparting thereto particularly desired physical characteristics. The alumina is dried at any suitable temperature within the range of from about room temperature to about 210° F. It is preferred that the alumina be not dried at an excessively rapid rate, as this tends to result in the rapid evolution of water, in turn resulting in at least a partial destruction of the alumina structure. The dried alumina is then composited with halogen, either chloride, fluoride, or both, in the desired quantity, if such halogen is not already intimately combined with the alumina. The concentration of halogen in the final composite will be within the range of from about 0.1% to about 8.0% by weight of the finished catalyst, calculated as elemental halogen. When fluoride is to be combined with the catalyst, it is preferred to incorporate the same prior to compositing of additional halogen as combined chloride. The alumina-halogen composite is then dried as hereinbefore set forth.

The platinum is added to the alumina-combined halogen composite in the form of an aqueous solution of a suitable platinum compound, and particularly chloroplatinic and/or bromoplatinic acid containing sufficient platinum to yield a final composite having from about 0.01% to about 1.0% by weight of platinum combined therewith. When bromoplatinic acid is employed, at least in part, the final composite will not contain significant quantities of bromine. This is due to the comparative ease by which the bromine is removed during subsequent steps in the manufacturing process. The resulting slurry is sufficiently stirred to obtain intimate mixing of the components, and is subsequently dried at a temperature of from about 80° F. to about 210° F. and thereafter rinsed with a suitable inert material such as methyl alcohol, to remove traces of organic contaminants.

The wet platinum-alumina-chloride-fluoride catalyst is subjected to the treatment with sulfur dioxide at a temperature in excess of 25° C., and preferably within the range of about 100° C. to about 700° C. Intermediate temperatures are particularly preferred, and lie within the range of from about 150° C. to about 400° C.

The treatment with sulfur dioxide is followed by purging the catalytic composite with any suitable gaseous material not having reactive propensities toward the sulfur dioxide, the refractory material, or the platinum component. The preferred method of the present invention employs nitrogen at a temperature of from about 200° C. to about 600° C.; air is employed at a like temperature, following the sweeping treatment with nitrogen, to induce an oxidizing action upon the composite. Thereafter, the catalytic composite may be subjected to a reducing treatment at a temperature in excess of 25° C., with an upper limit of about 1000° C. The preferred method employs a temperature of from about 150° C. to about 500° C. and an atmosphere of hydrogen. The catalyst may be placed in the reaction zone, and therein subjected to the reducing treatment when the latter is an integral step of the process to be effected. The treatment with sulfur dioxide will impart an increased degree of activity to either an oxidized or unoxidized catalytic composite.

When the refractory inorganic oxide, prepared in accordance with the previously described method of the present invention, is ultimately employed in the manufacture of catalytic composites, it may be composited with the desired catalytic components immediately after the treatment with sulfur dioxide. That is, there need not necessarily be an intermediate step of air-oxidation, at elevated temperatures, prior to impregnating the refractory material with the catalytically active metallic components. Usually, however, the refractory material is not used immediately, but is temporarily stored prior to the impregnating procedure. In such instances, it is common practice to subject the inorganic oxide to a high-temperature calcination treatment, in the presence of air (or other free oxygen-containing gaseous media), for the purpose of insuring substantially completely oxidized refractory material.

Similarly, following the impregnation of the inorganic oxide with the active metallic components, the catalytic composite is generally subjected to high-temperature calcination, in an atmosphere of air, to achieve a substantially completely oxidized composite. In any case, it is intended to be within the scope of the present invention, to prepare a refractory inorganic metal oxide, for utilization as a carrier material for catalytic composites, through the use of sulfur dioxide, either before, or after the inorganic oxide has been subjected to high-temperature calcination, and either before or after the active metal components have been composited therewith. The particularly preferred method is to contact the wet refractory inorganic oxide prior to the impregnating procedure.

In those instances wherein the reforming catalyst is to be regenerated in situ, sulfur dioxide may be employed to remove various organic and inorganic contaminants therefrom. Further, the sulfur dioxide will exhibit dehydration tendencies in the removal of water from the reaction system and from the catalytic composite. As hereinbefore described, in the several embodiments of the present invention, the use of sulfur dioxide will advantageously affect the physical characteristics of the carrier material, the active metallic component, and effect the deposition of sulfur as necessary to inhibit the detrimental reactions taking place during the initial stages of the process.

I claim as my invention:

1. A process for the manufacture of a refractory inorganic metal oxide of increased surface area which comprises preparing a wet refractory metal oxide, thereafter contacting said oxide in the wet condition with sulfur dioxide at a temperature in excess of 25° C., and calcining the thus treated oxide.

2. A process for the manufacture of alumina of increased surface area which comprises preparing a wet alumina, thereafter contacting the alumina in the wet condition with sulfur dioxide at a temperature in excess of 25° C., and calcining the thus treated alumina.

3. A process for the manufacture of alumina of increased surface area which comprises preparing an alumina hydrogel, contacting the prepared hydrogel, while still in the undried state, with sulfur dioxide at a temperature of from about 100° C. to about 700° C. and calcining the $SO_2$-treated alumina hydrogel.

4. A method for manufacturing a refractory inorganic metal oxide-noble metal containing catalytic composite which comprises preparing a wet inorganic metal oxide, contacting the prepared oxide in the wet condition with sulfur dioxide at a temperature of from about 100° C. to about 700° C. and thereafter impregnating the sulfur dioxide-treated metal oxide with said noble metal.

5. The method of claim 4 further characterized in that said noble metal comprises platinum.

6. The method of claim 4 further characterized in that said noble metal comprises palladium.

7. A method for manufacturing an alumina-platinum catalytic composite which comprises preparing an alumina hydrogel, contacting the undried hydrogel, at a temperature within the range of about 100° C. to about 700° C., with sulfur dioxide, calcining the sulfur dioxide-treated alumina at elevated temperatures, compositing platinum with said calcined alumina and thereafter drying and calcining the resulting alumina-platinum composite.

8. The method of claim 7 further characterized in that said alumina hydrogel is contacted with sulfur dioxide at a temperature within the range of from about 150° C. to about 400° C.

References Cited in the file of this patent

UNITED STATES PATENTS

| | | |
|---|---|---|
| 2,370,707 | Archibald | Mar. 6, 1945 |
| 2,859,185 | Kimberlin | Nov. 4, 1958 |